Patented Feb. 22, 1938

2,108,994

UNITED STATES PATENT OFFICE 2,108,994

DYESTUFF PRINTING PASTE

Walter Reppe, Friederich Hoelscher, and Alwin Schneevoigt, Ludwigshafen - on - the - Rhine, Germany, assignors to General Aniline Works, Inc., New York, N. Y., a corporation of Delaware No Drawing. Application September 30, 1936, Serial No. 103,388. In Germany October 5, 1935

4 Claims. (Cl. 8—6)

The present invention relates to dyestuff printing pastes.

In the preparation of printed textiles, the uniformity of the prints depends to a great extent on the nature of the thickening employed. The most usual thickening agents are the varieties of starch including burnt starches, tragacanth and various kinds of gum. Of these, starch alone is scarcely employed for the preparation of printing paste thickenings because by reason of the jelly-like form of starch paste, printing colors prepared therewith become too short and consequently are of little use for the production of large surfaces having a uniform appearance. The starch is therefore usually mixed with other thickening agents, in particular tragacanth or different kinds of gum, a greater flexibility of the printing colors thus being obtained.

For tragacanth and the various kinds of gum, which are too expensive, it has already been proposed to substitute other products, as for example locust bean gum, the so-called soluble starches (which can be obtained by the action of dilute acids, alkalies and oxidizing agents, as for example bleaching powder, or of diastatic ferments, as for example biolase, on starch or locust bean gum) and finally water-soluble derivatives of cellulose, such as cellulose methyl ether. These agents are also not entirely satisfactory because in part they readily deteriorate, yield non-uniform prints, do not yield sufficiently strong colorings for the amount of dyestuff employed or are alkali-sensitive.

We have now found that water-soluble interpolymerization products derived from two or more vinyl ethers or at least one water-soluble vinyl ether and at least one other vinyl compound capable of polymerization under practically the same polymerization conditions, are especially suitable as thickening agents for printing pastes. Water-soluble polymeric vinyl ethers are for example polymeric vinyl methyl ether or the polymeric monovinyl ethers of mono-, di- or higher poly-ethylene or poly-propylene glycols or their derivatives, as for example their esters or ethers.

Further vinyl compounds suitable for the preperation of interpolymerization products with the vinyl ethers are for example vinyl ethyl ether, vinyl propyl ether, vinyl isopropyl ether, vinyl butyl ether, vinyl isobutyl ether and the vinyl ethers of higher aliphatic alcohols up to alcohols containing 35 carbon atoms (such as may be obtained for example from vegetable and animal fats or fatty acids or from vegetable or mineral waxes), as for example octyl vinyl ether, decyl vinyl ether, dodecyl vinyl ether, tetradecyl vinyl ether, octodecyl vinyl ether and docosyl vinyl ether, and also vinyl ethers of unsaturated alcohols, such as vinyl oleyl ether, and phenyl vinyl ether, cyclohexyl vinyl ether, the vinyl ethers of such alcohols as are obtainable by the reduction of resinic and naphthenic acids, as for example hydroabietinol vinyl ethers, and also the vinyl ethers of aldehyde and ketone klycerol acetals, as for example formaldehyde glycerol acetal vinyl ether and acetone glycerol acetal vinyl ether.

The polymerization products or interpolymerization products may be prepared for example from the said vinyl ethers as described in the U. S. P. No. 2,104,000 granted December 28, 1937. If desired there may be added during the polymerization further vinyl compounds which are capable of polymerization under the polymerization conditions, as for example styrene, vinyl sulphides, as for example vinyl octodecyl sulphide, substituted aromatic vinyl amines or vinyl carbazoles. Such polymerization products, especially the polymerization products or interpolymerization products prepared by polymerization at low temperatures, as for example at from 60° below zero C. to 10° C., yield with water, even in the cold, clear highly viscous solutions or highly viscous turbid, emulsion-like solutions. The said highly viscous turbid emulsion-like solutions are entirely stable in contrast to true emulsions which are obtained by the emulsification of polymerization products of vinyl ethers which are themselves insoluble in water, in water in which a water-soluble polymerized vinyl ether is already dissolved.

The products of the said kind may be employed as such or in admixture with other thickening agents, as for example wheat starch, as thickening agents for dyestuff printing pastes. Such pastes yield uniform and level prints of very good fastness to washing and rubbing, for example in Indanthrene dyestuff printing as well as in cotton printing and in particular in artificial silk printing. They furnish strong colorings for the amount of dyestuff employed and have an excellent capacity for dyeing through, the soft touch of the printed fabric being retained.

The following examples will further illustrate how the present invention may be carried out in practice but the invention is not restricted to these examples. The parts are by weight.

*Example 1*

100 parts of Indanthrene Blue RS paste (Shultz, Farbstofftabellen, 7th edition, No. 1228)

are made into a paste with 200 parts of water and stirred into 700 parts of a 20 per cent solution of an interpolymerization product which has been obtained by the polymerization of vinyl methyl ether with an addition of 2 per cent of vinyl octodecyl ether in the presence of a small amount of boron fluoride dihydrate in dioxane solution at 40° below zero C. After printing the resulting color onto cotton fabric, the printed fabric is treated with a slop-padding solution containing in each 1000 parts:—100 parts of sodium formaldehyde sulphoxylate, 690 parts of water, 120 parts of potassium carbonate, 15 parts of N-benzyl-amino benzene para-sulphonic acid sodium salt and 75 parts of glycerol.

After drying the fabric is steamed for from 5 to 10 minutes in a steaming apparatus, rinsed and soaped at the boiling point.

The print has a sharp outline and a very level dyeing with a good yield and good fastness to washing.

Instead of the interpolymerization product derived from vinyl methyl ether and vinyl octodecyl ether there can be employed in a similar manner interpolymerization products derived from 97 per cent of vinyl methyl glycol ether and 3 per cent of hydroabietinol vinyl ether or from 97 per cent of vinyl methyl ether and 3 per cent of formaldehyde glycerol acetal vinyl ether.

Example 2

100 parts of Indanthrene Orange RRT paste (ibid., volume 2, page 131) are made into a paste with 200 parts of water and stirred into 700 parts of a 20 per cent solution of the interpolymerization product described in Example 1. After printing the resulting color onto viscose artificial silk, the fabric is treated with a slop-padding solution in the manner described in Example 1. After drying, steaming, rinsing and soaping at the boiling point in the manner described in Example 1, a very level, uniform print having good fastness to washing is obtained.

The print obtained under identical conditions with a thickening of methyl cellulose is non-uniform and weaker in color.

Example 3

100 parts of Indanthrene Brilliant Green B paste (ibid., No. 1269) are made into a paste with 200 parts of water and stirred into a thickening consisting of 350 parts of a 20 per cent solution of wheat starch and 350 parts of a 33 per cent solution of an interpolymerization product which has been obtained by the polymerization of vinyl methyl ether with an addition of 5 per cent of vinyl octodecyl ether in the presence of small amounts of boron fluoride dihydrate in dioxane solution at 20° below zero C. After printing the color onto viscose artificial silk, the printed fabric is treated in the manner described in Example 1.

A level print having a good yield and good fastness to washing is obtained.

Example 4

100 parts of Indanthrene Brilliant Violet 4R paste (ibid., volume 2, page 128) are made into a paste with 200 parts of water and stirred into a thickening consisting of 350 parts of a 20 per cent solution of wheat starch and 350 parts of a 20 per cent solution of the interpolymerization product described in Example 1.

After printing the color onto viscose artificial silk, the fabric is further treated in the manner described in Example 1.

The print thus obtained is more level and stronger in color than a print which has been obtained while using a thickening of methyl cellulose and wheat starch.

Example 5

100 parts of Indanthrene Brilliant Violet 4R paste are made into a paste with 200 parts of water and stirred into a thickening consisting of 350 parts of a 20 per cent solution of wheat starch and 350 parts of a 20 per cent solution of an interpolymerization product which has been obtained by the polymerization of vinyl methyl ether with an addition of 10 per cent of vinyl octodecyl ether in the presence of small amounts of boron fluoride dihydrate in dioxane solution at from 10° to 20° below zero C. After printing the color onto viscose artificial silk, the fabric is further treated according to Example 1. A level print having a good yield is thus obtained.

Example 6

100 parts of Indanthrene Blue RS double paste are made into a paste with 200 parts of water and a thickening agent consisting of 350 parts of a 20 per cent aqueous solution of wheat starch and 350 parts of an 18 per cent aqueous solution of an interpolymerization product obtained by polymerizing vinyl methyl ether with an addition of 9.2 per cent of vinyl octodecyl ether in the presence of small amounts of boron fluoride dihydrate dissolved in dioxane at 10° below zero C. After printing the resulting color onto viscose artificial silk, the latter is further treated in the same manner as described in Example 1.

Very uniform prints of deep color are thus obtained, which like the prints obtained according to the foregoing examples are distinguished by an excellent fastness to washing and rubbing.

What we claim is:—

1. Dyestuff printing pastes containing water-soluble interpolymerization products of a water-soluble vinyl ether and a water-insoluble vinyl ether as thickening agents.

2. Dyestuff printing pastes containing a water-soluble interpolymerization product derived from vinyl methyl ether and vinyl octodecyl ether as a thickening agent.

3. Dyestuff printing pastes containing a water-soluble interpolymerization product derived from vinyl methyl glycol ether and hydroabietinol vinyl ether as a thickening agent.

4. Dyestuff printing pastes containing a water-soluble interpolymerization product derived from vinyl methyl ether and formaldehyde glycerol acetal vinyl ether as a thickening agent.

WALTER REPPE.
FRIEDERICH HOELSCHER.
ALWIN SCHNEEVOIGT.